United States Patent
Yokokura et al.

(10) Patent No.: US 10,923,294 B2
(45) Date of Patent: Feb. 16, 2021

(54) CARBON PASTE AND CAPACITOR ELEMENT FOR A SOLID ELECTROLYTIC CAPACITOR USING CARBON PASTE

(71) Applicant: Murata Manufacturing Co., Ltd., Nagaokakyo (JP)

(72) Inventors: Osamu Yokokura, Nagaokakyo (JP); Suguru Nakano, Nagaokakyo (JP); Yuji Kishida, Nagaokakyo (JP); Akihiro Nomura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 530 days.

(21) Appl. No.: 15/689,153

(22) Filed: Aug. 29, 2017

(65) Prior Publication Data
US 2018/0061587 A1 Mar. 1, 2018

(30) Foreign Application Priority Data
Aug. 30, 2016 (JP) .................. 2016-167555

(51) Int. Cl.
*H01G 11/38* (2013.01)
*C08K 3/04* (2006.01)
*H01G 9/15* (2006.01)
*H01G 9/042* (2006.01)
*C01B 32/20* (2017.01)
*C08L 71/12* (2006.01)
*C09C 1/48* (2006.01)
*C08L 63/04* (2006.01)

(52) U.S. Cl.
CPC .............. *H01G 11/38* (2013.01); *C01B 32/20* (2017.08); *C08K 3/04* (2013.01); *C08L 71/12* (2013.01); *C09C 1/48* (2013.01); *H01G 9/0425* (2013.01); *H01G 9/15* (2013.01); *C08L 63/04* (2013.01); *C08L 2203/20* (2013.01)

(58) Field of Classification Search
None
See application file for complete search history.

(56) References Cited

U.S. PATENT DOCUMENTS 9,666,376 B2 5/2017 Mishima et al.
2014/0334071 A1 11/2014 Endo et al.
2015/0009606 A1* 1/2015 Mishima .................. H01G 9/15
361/532

FOREIGN PATENT DOCUMENTS

| | | |
|---|---|---|
| CN | 101409153 A | 4/2009 |
| CN | 104221106 A | 12/2014 |
| JP | S628513 A | 1/1987 |
| JP | 2000215729 A | 8/2000 |
| JP | 2008311639 A | 12/2008 |
| WO | WO 2013111438 A1 | 8/2013 |

* cited by examiner

*Primary Examiner* — Monica A Huson
*Assistant Examiner* — Kelsey C Grace
(74) *Attorney, Agent, or Firm* — Arent Fox LLP

(57) ABSTRACT

A carbon paste that includes at least a carbon filler, and a thermosetting resin including a phenoxy resin. The phenoxy ratio X in the thermosetting resin is within a range of 20 Wt %≤X≤70 Wt %, and the carbon filler content ratio Y with respect to a total of the carbon filler and the thermosetting resin is within a range of 30 Wt %≤Y≤70 Wt %.

10 Claims, 1 Drawing Sheet

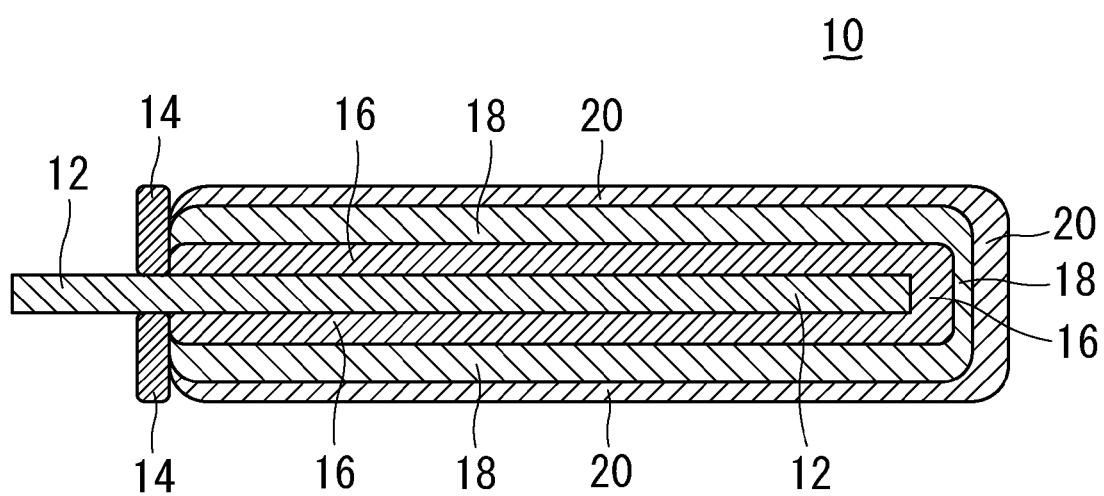

CARBON PASTE AND CAPACITOR ELEMENT FOR A SOLID ELECTROLYTIC CAPACITOR USING CARBON PASTE

CROSS REFERENCE TO RELATED APPLICATIONS

The present application claims priority to Japanese Patent Application No. 2016-167555, filed Aug. 30, 2016, the entire contents of which are incorporated herein by reference.

BACKGROUND OF THE INVENTION

Field of the Invention

The present invention relates to a carbon paste and a capacitor element for a solid electrolytic capacitor, which uses the carbon paste. More particularly, a carbon paste for forming an electrode layer on a capacitor body including a solid electrolyte layer.

Description of the Related Art

Conventional solid electrolytic capacitor elements include a solid electrolytic capacitor element including, on an anode body surface, at least a dielectric layer, a solid electrolyte layer, a carbon layer including a first resin component, and a conductor layer including a second resin component. The first resin component and the second resin component both have hydroxyl groups, and a difference $\Delta\gamma h$ ($=\gamma h2-\gamma h1$) between a hydrogen-bonding component value $\gamma h1$ [mN/m] of the carbon layer surface and a hydrogen-bonding component value $\gamma h2$ [mN/m] of the conductor layer surface falls within a range of $-3 \leq \Delta\gamma h \leq 3$ [mN/m].

In this conventional solid electrolytic capacitor element, the resin composition of the first resin component and the resin composition of the second resin component are limited by the difference in surface free energy hydrogen-bonding component value between the first resin component and the second resin component. Further, it has been confirmed that the rate of contact resistance change with respect to the thermal shock is reduced when the difference in surface free energy hydrogen-bonding component value between the first resin component and the second resin component falls within the limited range ($-3 \leq \Delta\gamma h \leq 3$ [mN/m]).

More specifically, in this conventional solid electrolytic capacitor element, among properties of the carbon layer and conductor layer in contact with each other, the difference in hydrogen-bonding component value $\gamma h$ between the solid surfaces of the both layers is controlled/adjusted to fall within the range mentioned above, thereby making it possible to reduce the degradation and variation in contact resistance value, and thus the degradation and variation in equivalent series resistance (ESR). Thus, this solid electrolytic capacitor element can achieve not only favorable initial characteristics of an equivalent series resistance (ESR), but also little degradation in the ESR due to the thermal shock, and a reduced variation in the ESR change. (for example, see International Publication WO2013/111438)

SUMMARY OF THE INVENTION

Some of such solid electrolytic capacitor elements have solid electrolyte layers formed by chemical polymerization. The chemical polymerization is performed by, for example, monomer polymerization through the immersing of aluminum foil with an oxide film layer in a monomer solution, and then immersing the foil in an oxidant solution. The thus obtained solid electrolyte layers have a multilayer structure, which is likely to have delamination caused by a stress.

In the formation of electrode layers on the foregoing solid electrolyte layers, for the preparation of the carbon layer formed for the solid electrolytic capacitor element in International Publication WO2013/111438, a carbon paste is applied onto the solid electrolyte layers, and then subjected to drying and/or curing, thereby providing carbon layers.

In this case, the carbon layers include the first resin component, and the first resin component can include a thermosetting resin such as an epoxy resin, a phenoxy resin, a phenolic resin, an amino resin, and an urethane resin. Therefore, there is a possibility that the shrinkage stress of the first resin component during drying of the carbon layers will put loads on oxide films (dielectric layers) at sintered body surfaces of valve-action metal, thereby breaking down the oxide films (dielectric layers). Therefore, there is a possibility that leakage current (LC) defects will be caused by the breakdown of the oxide films (dielectric layers).

This is due to covering the influence of, on the degree of contact resistance degradation, the affinity based on the chemical compositions of the carbon layer including the first resin component and of the conductor layer including the second resin component. More specifically, because the first resin component and the second resin component are limited by the difference in surface free energy hydrogen-bonding component value, only insufficient information is provided for controlling mechanical characteristics of the resins. Accordingly, even when solid electrolytic capacitor elements are created, the elements are more likely to be insufficient in that leakage current (LC) characteristics are degraded.

Therefore, a main object of the present invention is to provide a carbon paste which can reduce the shrinkage stress during drying, and achieve a capacitor element for a solid electrolytic capacitor which has favorable LC characteristics.

In addition, another object of the present invention is to provide a capacitor element for a solid electrolytic capacitor which has favorable LC characteristics, by reducing the shrinkage stress during drying with the use of the carbon paste according to the present invention.

A preferred embodiment of the present invention is a carbon paste for use in electrode formation for a capacitor element of a solid electrolytic capacitor. The carbon paste includes at least a carbon filler, and a thermosetting resin including a phenoxy resin. A phenoxy ratio X in the thermosetting resin is within a range of 20 Wt %$\leq$X$\leq$70 Wt %, and a carbon filler content ratio Y with respect to a total of the carbon filler and the thermosetting resin is within a range of 30 Wt %$\leq$Y$\leq$70 Wt %.

Preferably, the phenoxy ratio X is within a range of 25 Wt %$\leq$X$\leq$70 Wt %.

The phenoxy resin preferably has a molecular weight Mw within a range of 30000$\leq$Mw$\leq$100000.

The thermosetting resin preferably includes an epoxy resin in addition to the phenoxy resin.

In a further embodiment, the capacitor element of a solid electrolytic capacitor includes a carbon layer formed by using the carbon paste described herein.

According to the present invention, a carbon paste can be obtained which is capable of reducing the shrinkage stress during drying, and forming a capacitor element constituting a solid electrolytic capacitor which has favorable LC characteristics.

The foregoing object, other objects, features, and advantages of the present invention will be further evident from the following description taken with reference to the drawings.

BRIEF DESCRIPTION OF THE DRAWING

The FIG. 1 is a schematic diagram illustrating an example of a capacitor element constituting a solid electrolytic capacitor according to the present invention.

DETAILED DESCRIPTION OF THE INVENTION

The FIG. 1 is a schematic diagram illustrating an example of a capacitor element for a solid electrolytic capacitor according to an embodiment of the present invention. The capacitor element 10 includes a valve-action metal substrate body 12. For example, aluminum chemical conversion foil is used as the valve-action metal substrate body 12. The aluminum chemical conversion foil has a dielectric oxide film formed around aluminum foil, which is used as an anode element. In this regard, the dielectric oxide film can be formed by applying a voltage with the surface of aluminum foil immersed in an aqueous solution of ammonium adipate.

In a location at a predetermined distance from an end of the valve-action metal substrate body 12, an insulating layer 14 is formed. The insulating layer 14 is formed for preventing an anode and a cathode from being short-circuited. The insulating layer 14 is formed in a band-like shape, so as to make a circuit of the valve-action metal substrate body 12. On a large-surface area part of the valve-action metal substrate body 12 divided and thus separated by the insulating layer 14, a solid electrolyte layer 16 is formed by, for example, chemical polymerization. The solid electrolyte layer 16 is formed by repeating, more than once, a step of immersing, in a polymer solution, the surface of the aluminum chemical conversion foil with the dielectric oxide film formed, and then immersing the surface in an oxidant solution. The formation of the solid electrolyte layer 16 by such chemical polymerization results in causing the solid electrolyte layer 16 to have a multilayer structure. In order to form the solid electrolyte layer 16, a conducting polymer can be used which has, for example, a polythiophene skeleton.

On the solid electrolyte layer 16, a carbon layer 18 is formed. The carbon layer 18 is formed by immersing the surface of the solid electrolyte layer 16 in a carbon paste, and drying the paste. Alternatively, the carbon layer 18 may be formed by applying a carbon paste onto the solid electrolyte layer 16, and drying the paste.

The carbon paste composed of a conductive filler, a thermosetting resin including a phenoxy resin as a base resin, a curing agent, a diluent, a curing accelerator, and the like is used for forming the carbon layer 18. For example, the conductive filler can be formed from a carbon powder that is a mixture of carbon black and graphite.

In addition, as the thermosetting resin, for example, a cresol novolac-type epoxy resin, a phenoxy resin, and a phenolic resin are used. Besides, phenol novolac-type epoxy resins, bisphenol-type epoxy resins, and the like can be used. The phenoxy resin, as a polyhydroxy polyether synthesized from bisphenols and epichlorohydrin, is used which has a weight average molecular weight (Mw) in a range of $30,000 \leq Mw \leq 100,000$.

The phenolic resin also functions as a curing agent, and known curing agents other than the phenolic resin can also be used. In addition, for example, tertiary amine curing accelerators, imidazole, and imidazole curing accelerators can be used as the curing accelerator. In addition, for example, dipropylenemethyl ether acetate (DPMA) or the like is used as the diluent. Carbitol organic solvents and the like can be also used.

The carbon paste for forming the carbon layer 18 mentioned above is formed such that when a ratio of the phenoxy resin included in the thermosetting resin, that is, the ratio of the phenoxy resin included in the thermosetting resin obtained by adding the epoxy resin as a base resin, the phenoxy resin, and the phenolic resin is regarded as a phenoxy ratio (Wt %), the phenoxy ratio (Wt %) falls within a range of $20 \leq Wt\% \leq 70$. In addition, more preferably, the paste is formed such that the phenoxy ratio (Wt %) falls within a range of $25 \leq Wt\% \leq 70$.

Furthermore, the paste is formed such that when the ratio of the carbon powder included in the total of the carbon powder as the carbon filler mentioned above, the base resin including the epoxy resin, the phenoxy resin, and the phenolic resin is regarded as a carbon content ratio (Wt %), the carbon content ratio (Wt %) falls within the range of $30 \leq Wt\% \leq 70$.

On the carbon layer 18, an electrode layer 20 to serve as a cathode layer is formed. The electrode layer 20 is formed by immersing the surface of the carbon layer 18 in a conductive paste, and drying the paste on the surface. Alternatively, the electrode layer 20 may be formed by applying a conductive paste onto the carbon layer 18, and drying the paste.

As the conductive paste for forming the electrode layer 20, a paste is used which is composed of a conductive filler, a thermosetting resin including a phenoxy resin, a curing agent, a diluent, a curing accelerator, and the like. As the conductive filler, a silver powder is used, such as flake-like, spherical, and amorphous silver powders.

In addition, a cresol novolac-type epoxy resin and a phenoxy resin are used as the thermosetting resin. Besides, phenol novolac-type epoxy resins, bisphenol-type epoxy resins, and the like can be used. The phenoxy resin, as a polyhydroxy polyether synthesized from bisphenols and epichlorohydrin, has a weight average molecular weight (Mw) of 15,000 or more.

As the curing agent, for example, a phenolic resin is used. In addition, as the diluent, for example, dipropylenemethyl ether acetate or the like is used. Carbitol organic solvents and the like can also be used. In addition, for example, a tertiary amine curing accelerator or an imidazole curing accelerator is used as the curing accelerator.

This conductive paste is used to form the electrode layer 20 on the carbon layer 18. In this regard, the insulating layer 14 is formed, thereby preventing any short circuit between the valve-action metal substrate body 12 and the electrode layer 20.

An exposed part of the valve-action metal substrate body 12 of the thus obtained capacitor element 10 and an external connection terminal are subjected to resistance welding, the electrode layer 20 to serve as a cathode layer and another external connection terminal are joined with a conductive adhesive, and sealing with an exterior resin is performed such that the external connection terminals are partially exposed, thereby making it possible to obtain a solid electrolytic capacitor.

In the carbon layer 18 formed with the use of the carbon paste mentioned above, the mixture ratios of the epoxy resin as a base resin, the phenoxy resin, and the phenolic resin are set and controlled as follows. More specifically, the phenoxy ratio (Wt %) mentioned above is set to fall within a range of $20 \leq Wt\% \leq 70$, and the carbon content ratio (Wt %) mentioned above is set to fall within a range of $30 \leq Wt\% \leq 70$. Therefore, the shrinkage due to curing of the base resin (the thermosetting resin such as an epoxy resin) during drying can be reduced by the stress relaxation effect of the phenoxy resin, thereby relaxing the shrinkage stress between the dielectric oxide film of the valve-action metal substrate body 12 and the carbon paste.

Accordingly, the dielectric oxide film can be prevented from being broken down by the shrinkage stress, and the capacitor element 10 can thus achieve favorable LC characteristics.

In addition, the phenoxy ratio (Wt %) is preferably set to fall within the range of $25 \leq Wt\% \leq 70$, and the molecular weight of the phenoxy resin is preferably set to fall within the range of $30,000 \leq Mw \leq 100,000$. In this case, the capacitor element 10 can achieve much more favorable LC characteristics.

In addition, the phenolic resin is excellent in heat resistance, and less likely to be altered even by heating or the like for laminating the element, and thus intended to make a contribution to improved element reliability.

EXAMPLES

For example, aluminum chemical conversion foil of 3 mm in the short-axis direction, 10 mm in the long-axis direction, and 100 µm in thickness was used as a valve-action metal substrate body for a capacitor element. In order to obtain this aluminum chemical conversion foil, a dielectric oxide film was formed so as to cover aluminum foil, and the obtained aluminum chemical conversion foil was regarded as an anode element. The dielectric oxide film was formed by chemically converting the surface of the aluminum foil with the use of an aqueous solution of ammonium adipate.

Next, in order to prevent an anode and a cathode from being short-circuited, in a location at a predetermined distance from an end of the aluminum chemical conversion film in the long-axis direction, an insulating layer was formed in a band-like shape so as to make a circuit of the aluminum chemical conversion foil. Thereafter, a solid electrolyte layer was formed on a large-surface area part of the aluminum chemical conversion foil divided by the insulating layer. In this regard, the solid electrolyte layer was formed by repeating, more than once, a step of immersing, in a monomer solution, the surface of the aluminum chemical conversion foil with the dielectric oxide film formed, and then immersing the surface in an oxidant solution. In order to obtain the solid electrolyte layer, a conducting polymer with a polythiophene skeleton was used.

Next, a carbon paste was applied onto the solid electrolyte layer, and dried to form a carbon layer. A carbon paste composed of a conductive filler, a thermosetting resin including a phenoxy resin as a base resin, a curing agent, a diluent, a curing accelerator, and the like was used as the carbon paste. More specifically, for example, a carbon filler formed from a carbon powder formed from a mixture of carbon black and graphite was used as the conductive filler. In addition, for example, a cresol novolac-type epoxy resin with a weight average molecular weight (Mw) of 2000 as the base resin and a phenolic resin were used. In addition, a phenoxy resin was used as the thermosetting resin. Furthermore, an imidazole curing accelerator was used as the curing accelerator, and dipropylenemethyl ether acetate (DPMA) was used as the diluent.

An exposed part of the valve-action metal substrate body of the thus obtained capacitor element was joined to an external connection terminal by resistance welding, and the electrode layer and another external connection terminal were joined with a conductive adhesive. Thereafter, sealing with an exterior resin is performed such that the external connection terminals were partially exposed, thereby providing a solid electrolytic capacitor.

The respective materials mentioned above were mixed in accordance with the combination ratio shown in Table 1 below, thereby preparing a carbon paste for each of examples and comparative examples.

TABLE 1

| | Combination Ratio (mass %) | | | | | |
| --- | --- | --- | --- | --- | --- | --- |
| | Conductive | Thermosetting Resin | | Curing Agent | Curing | |
| | Filler Carbon | Epoxy Resin | Phenoxy Resin | Phenolic Resin | Accelerator Imidazole | Diluent DPMA |
| Example 1 | 30.6 | 11.5 | 13.4 | 5.5 | 0.2 | 38.8 |
| Example 2 | | | | | | 38.8 |
| Example 3 | | | | | | 38.8 |
| Example 4 | | | | | | 38.8 |
| Example 5 | | | | | | 38.8 |
| Example 6 | | | | | | 38.8 |
| Example 7 | | 16.4 | 6.1 | 7.9 | | 38.8 |
| Example 8 | | 15.4 | 7.6 | 7.4 | | 38.8 |
| Example 9 | | 14.3 | 9.1 | 6.9 | | 38.9 |
| Example 10 | | 11.3 | 13.7 | 5.4 | | 38.8 |
| Example 11 | | 6.1 | 21.3 | 2.9 | | 38.9 |
| Example 12 | 15.9 | 13.9 | 16.2 | 6.7 | | 47.1 |
| Example 13 | 22.7 | 12.8 | 14.9 | 6.2 | | 43.2 |
| Example 14 | 39.8 | 9.9 | 11.6 | 4.8 | | 33.7 |
| Example 15 | 50.7 | 8.1 | 9.5 | 3.9 | | 27.6 |
| Comparative Example 1 | 30.6 | 17.4 | 4.6 | 8.4 | 0.2 | 38.8 |

TABLE 1-continued

| | Combination Ratio (mass %) | | | | | |
|---|---|---|---|---|---|---|
| | Conductive | Thermosetting Resin | | Curing Agent | Curing | |
| | Filler Carbon | Epoxy Resin | Phenoxy Resin | Phenolic Resin | Accelerator Imidazole | Diluent DPMA |
| Comparative Example 2 | 10.0 | 14.9 | 17.4 | 7.2 | 0.2 | 50.3 |
| Comparative Example 3 | 63.8 | 5.9 | 6.9 | 2.9 | 0.2 | 20.3 |

Epoxy Resin: Base Resin
DPMA: dipropylenemethyl ether acetate

This carbon paste was used to form a cathode layer over the carbon layer. In this regard, the conductive paste was applied onto the carbon layer through immersion, and subjected to a heat treatment at 80° C. for 30 minutes, and then to a heat treatment at 200° C. for 60 minutes, thereby forming an electrode layer.

For the thus obtained capacitor element, a leakage current (LC) was measured with the use of an LCR meter. This data is taken at 16 V after 120 seconds from the application of the voltage. In this regard, for example, thirty-eight capacitor elements were subjected to the measurement, and when the number of samples with the LC within 0.1 CV was 73% or more of the total, a mark "⊙" was put. When the number of samples with the LC within 0.1 CV was 63% or more and less than 73% of the total, a mark "○" was put. When the number of samples with the LC within 0.1 CV was less than 63% of the total, a mark "Δ" was put. When the data varied too significantly to obtain data appropriate for use, a mark "x" was put. Further, Table 2 shows therein LC measurement results and LC determination results for Examples 1 to 16.

TABLE 3

| | Epoxy/Hydroxyl Equivalent | Equivalent Combination (g) | | Resin Ratio (wt %) | |
|---|---|---|---|---|---|
| Epoxy Resin | 218 | 100 | | 8.3 | |
| Phenoxy Resin | 7800 | | 100 | | 9.8 |
| Phenolic Resin | 105 | 48.17 | 1.35 | 3.99811 | 0.1323 |
| Total | | 148.17 | 101.35 | | |

Epoxy Resin: Base Resin
Phenolic Resin: curing agent

According to Examples 1 to 6 in Table 2, the ratio of base resin component/phenoxy resin by mass is 56/44, the content of the carbon powder (conductive filler) to the solid content in the carbon paste is 50 mass %, and the phenoxy resin is 50,000, 15,000, 30,000, 40,000, 60,000, and 100000 in weight average molecular weight (Mw).

In addition, according to Examples 1 to 6 in Table 2, the fact that the ratio of base resin component/phenoxy resin by mass is 56/44 means that the ratio of (epoxy resin as a base resin+phenolic resin)/(phenoxy resin) by mass is 56/44, that is, the proportion of the phenoxy resin is 44 mass % to the

TABLE 2

| | Base Resin | | | | Filler Component | LC | |
|---|---|---|---|---|---|---|---|
| | Component | | Phenoxy Resin | | Ratio in | Percentage | |
| | Molecular Weight Mw | Ratio in Resin Wt % | Molecular Weight Mw | Ratio in Resin Wt % | Cured Product wt % | of Samples within 0.1 CV | Determination |
| Example 1 | 2000 | 56 | 50000 | 44 | 50 | 78 | ⊙ |
| Example 2 | | | 15000 | | | 65 | ○ |
| Example 3 | | | 30000 | | | 73 | ⊙ |
| Example 4 | | | 40000 | | | 76 | ⊙ |
| Example 5 | | | 60000 | | | 84 | ⊙ |
| Example 6 | | | 100000 | | | 89 | ⊙ |
| Example 7 | | 80 | 50000 | 20 | | 65 | ○ |
| Example 8 | | 75 | | 25 | | 73 | ⊙ |
| Example 9 | | 70 | | 30 | | 76 | ⊙ |
| Example 10 | | 55 | | 45 | | 81 | ⊙ |
| Example 11 | | 30 | | 70 | | 86 | ⊙ |
| Example 12 | | 56 | | 44 | 30 | 84 | ⊙ |
| Example 13 | | | | | 40 | 81 | ⊙ |
| Example 14 | | | | | 60 | 76 | ⊙ |
| Example 15 | | | | | 70 | 73 | ⊙ |
| Comparative Example 1 | 2000 | 85 | 50000 | 15 | 50 | 28 | Δ |
| Comparative Example 2 | 2000 | 56 | 50000 | 44 | 20 | — | X |
| Comparative Example 3 | 2000 | 56 | 50000 | 44 | 80 | — | X | total of the epoxy resin and the phenoxy resin, and the phenolic resin in an amount that reacts with the epoxy and phenoxy resins.

In this regard, the base resin component and the phenoxy ratio will be described. The base resin component refers to a component including: the epoxy resin as a base resin; and the phenolic resin in an amount that reacts with the epoxy resin. Furthermore, the phenoxy ratio (Wt %) refers to the ratio of the phenoxy resin included in the thermosetting resin obtained by adding the epoxy resin and the phenoxy resin as a base resin, and the phenolic resin.

There is a need to consider the epoxy equivalent and the hydroxyl equivalent in the curing reaction between the resin and the curing agent. The epoxy equivalent refers to a molecular weight per epoxy group (site that undergoes the curing reaction), whereas the hydroxyl equivalent refers to a molecular weight per hydroxyl group (reaction site of the curing agent).

The thermosetting resin and the curing agent are mixed in accordance with a combination ratio of epoxy equivalent: hydroxyl equivalent. In this regard, the epoxy resin as a base resin and the phenoxy resin respectively have epoxy equivalents of 218 and 7800. In addition, the phenolic resin has a hydroxyl equivalent of 105. Accordingly, as shown in Table 3, 48.17 g and 1.35 g of the curing agent are respectively required for 100 g of the epoxy resin (base resin) and the phenoxy resin. As just described, when the epoxy resin (base resin) and the phenoxy resin are each 100 g, the total of the epoxy resin (base resin) and the curing agent is 148.17 g.

As is also clear from Table 2, according to Examples 1 to 15, the phenoxy ratio falls within the range of 20≤Wt %≤70, whereas the carbon content ratio falls within the range of 30≤Wt %≤70, and thus, as compared with Comparative Examples 1 to 3, the number of samples with the LC within 0.1 CV accounts for 65% or more of the total, which means favorable LC characteristics.

Furthermore, according to Example 1, Examples 3 to 6, and Examples 8 to 15, the pastes are formed such that the phenoxy ratio (Wt %) mentioned above falls within the range of 20≤Wt %≤70, and formed such that the carbon content ratio (Wt %) mentioned above falls within the range of 30≤Wt %≤70, and furthermore, the molecular weight of the phenoxy resin falls within the range of 30,000≤Mw≤100,000, and thus, the number of samples with the LC within 0.1 CV accounts for 73% or more of the total, which means further favorable LC characteristics.

In addition, according to Example 1, Examples 4 to 6, and Examples 9 to 14, the pastes are formed such that the phenoxy ratio (Wt %) falls within the range of 25≤Wt %≤70, and formed such that the carbon content ratio (Wt %) falls within the range of 30≤Wt %≤70, and furthermore, the molecular weight of the phenoxy resin falls within the range of 30,000≤Mw≤100,000, and thus, the number of samples with the LC within 0.1 CV accounts for 76% or more of the total, which means much more favorable LC characteristics.

Further, according to Example 2, the molecular weight (Mw) of the phenoxy resin is 15,000 and outside the range of 30,000≤Mw≤100,000. Therefore, according to Example 2, the number of samples with the LC within 0.1 CV accounts for 65% of the total, which means poor LC characteristics as compared with Examples 1, Examples 3 to 6, and Examples 8 to 15, but relatively favorable LC characteristics.

According to Comparative Example 1, the molecular weight of the phenoxy resin falls within the range of 30,000≤Mw≤100,000, and the carbon content ratio (Wt %) falls within the range of 30≤Wt %≤70, but the phenoxy ratio (Wt %) is 15 (Wt %) outside the range of 20≤Wt %≤70. Therefore, the number of samples with the LC within 0.1 CV accounts for a low percentage of 28% of the total, which means unfavorable LC characteristics.

According to Comparative Example 2, the carbon content ratio is 20 (Wt %), and thus, even when the carbon layer is formed, it is not possible to evaluate LC characteristics because conductivity is not acquired.

According to Comparative Example 3, the carbon content ratio is 80 (Wt %), and thus, it is not possible to evaluate LC characteristics because it is not possible to form the carbon layer itself.

According to the foregoing LC measurement results obtained through the use of Examples 1 to 15 and Comparative Examples 1 to 3, it is determined that the carbon paste formed by combining the carbon filler, the thermosetting resin containing the phenoxy resin, the curing agent, the curing accelerator, and the diluent is blended such that the phenoxy ratio (Wt %) mentioned above falls within the range of 20≤Wt %≤70, or within the range of 25≤Wt %≤70, whereas the carbon content ratio (Wt %) falls within the range of 30≤Wt %≤70, thereby making it possible to reduce or relax the shrinkage stress when the carbon paste is dried, and thus achieve a capacitor element constituting a solid electrolytic capacitor which has favorable LC characteristics.

What is claimed is:

1. A carbon paste comprising:
   carbon powder comprising a carbon-based material; and
   a thermosetting resin comprising a phenoxy resin, wherein
   a phenoxy ratio X in the thermosetting resin is within a range of 20 Wt %≤X≤70 Wt %, and
   a carbon powder content ration Y with respect to a total of the carbon powder and the thermosetting resin is within a range of 30 Wt %≤Y≤70 Wt %.

2. The carbon paste according to claim 1, wherein the phenoxy ratio X is 25 Wt %≤X≤70 Wt %.

3. The carbon paste according to claim 1, wherein the phenoxy resin has a molecular weight Mw within a range of 30,000≤Mw≤100,000.

4. The carbon paste according to claim 2, wherein the phenoxy resin has a molecular weight Mw within a range of 30,000≤Mw≤100,000.

5. The carbon paste according to claim 1, wherein the thermosetting resin further comprises an epoxy resin.

6. A capacitor element for a solid electrolytic capacitor, the capacitor element comprising:
   a valve-action metal substrate;
   a solid electrolyte layer covering at least a part of a surface of the valve-action metal substrate;
   a carbon layer on the solid electrolyte layer; and
   an electrode layer on the carbon layer, wherein
   the carbon layer is formed from a carbon paste comprising:
      carbon powder comprising a carbon-based material; and
      a thermosetting resin comprising a phenoxy resin, wherein
      a phenoxy ratio X in the thermosetting resin is within a range of 20 Wt %≤X≤70 Wt %, and
      a carbon powder content ratio Y with respect to a total of the carbon powder and the thermosetting resin is within a range of 30 Wt %≤Y≤70 Wt %.

7. The capacitor element according to claim 6, wherein the phenoxy ratio X is 25 Wt %≤X≤70 Wt %.

8. The capacitor element according to claim 6, wherein the phenoxy resin has a molecular weight Mw within a range of $30,000 \leq Mw \leq 100,000$.

9. The capacitor element according to claim 7, wherein the phenoxy resin has a molecular weight Mw within a range of $30,000 \leq Mw \leq 100,000$.

10. The capacitor element according to claim 6, wherein the thermosetting resin further comprises an epoxy resin.

* * * * *